(12) United States Patent
Colista et al.

(10) Patent No.: US 12,724,166 B2
(45) Date of Patent: Sep. 1, 2026

(54) SYSTEM AND METHOD FOR BROADBAND ACOUSTIC SOURCE

(71) Applicant: Baker Hughes Oilfield Operations LLC, Houston, TX (US)

(72) Inventors: Tobias Colista, Nienhagen (DE); Karsten Fuhst, Giesen (DE)

(73) Assignee: Baker Hughes Oilfield Operations LLC, Houston, TX (US)

( * ) Notice: Subject to any disclaimer, the term of this patent is extended or adjusted under 35 U.S.C. 154(b) by 247 days.

(21) Appl. No.: 18/343,371

(22) Filed: Jun. 28, 2023

(65) Prior Publication Data

US 2024/0004098 A1 Jan. 4, 2024

Related U.S. Application Data

(60) Provisional application No. 63/356,725, filed on Jun. 29, 2022.

(51) Int. Cl.

| | |
|---|---|
| ***G01V 1/52*** | (2006.01) |
| ***E21B 47/107*** | (2012.01) |
| ***G01V 1/44*** | (2006.01) |

(52) U.S. Cl.
CPC .............. *G01V 1/52* (2013.01); *E21B 47/107* (2020.05); *G01V 1/44* (2013.01)

(58) Field of Classification Search
CPC ........... G01V 1/44; G01V 1/52; E21B 47/107
See application file for complete search history.

(56) References Cited

U.S. PATENT DOCUMENTS

| | | | | |
|---|---|---|---|---|
| 4,302,826 | A * | 11/1981 | Kent | E21B 47/16 367/162 |
| 4,996,674 | A | 2/1991 | Thompson | |
| 5,515,342 | A | 5/1996 | Stearns | |
| 5,757,728 | A | 5/1998 | Tenghamn et al. | |
| 6,105,690 | A | 8/2000 | Biglin, Jr | |
| 6,135,234 | A | 10/2000 | Harris | |
| 6,834,743 | B2 * | 12/2004 | Arian | G01V 1/52 181/102 |
| 6,899,197 | B2 | 5/2005 | Arian | |
| 7,418,102 | B2 | 8/2008 | Hama | |
| 7,513,147 | B2 | 4/2009 | Yogeswaran | |
| 8,714,005 | B2 | 5/2014 | Vetter | |
| 9,389,329 | B2 | 7/2016 | Swett | |
| 9,476,293 | B2 | 10/2016 | Nakajima | |

(Continued)

FOREIGN PATENT DOCUMENTS

| | | | | |
|---|---|---|---|---|
| JP | 2001506768 A * | 5/2001 | | H04R 1/345 |
| WO | 01/41496 A2 | 6/2001 | | |

(Continued)

OTHER PUBLICATIONS

International Search Report and Written Opinion issued Oct. 20, 2023 in corresponding PCT Application No. PCT/US2023/026545.

*Primary Examiner* — Jill E Culler
(74) *Attorney, Agent, or Firm* — Hogan Lovells Cadwalader US LLP

(57) ABSTRACT

A system includes a carrier and a sound emitting member secured to the carrier. The sound emitting member includes a first mass coupled to the carrier by a first spring and a second mass coupled to the first mass by a second spring. The system also includes an actuator configured to transmit energy to the sound emitting member.

20 Claims, 5 Drawing Sheets

(56) References Cited

U.S. PATENT DOCUMENTS

| | | | |
|---|---|---|---|
| 9,638,026 | B2 | 5/2017 | Andersen |
| 9,927,541 | B2 * | 3/2018 | Kinoshita ................ G01V 1/44 |
| 9,976,406 | B2 | 5/2018 | Lautzenhiser |
| 10,288,758 | B2 * | 5/2019 | Chang .................... G01V 1/053 |
| 10,359,525 | B2 | 7/2019 | Jagannathan |
| 2002/0039328 | A1 | 4/2002 | Dubinsky et al. |
| 2009/0129203 | A1 | 5/2009 | Jones et al. |
| 2011/0192222 | A1 | 8/2011 | Vetter |
| 2012/0069708 | A1 | 3/2012 | Swett |
| 2012/0090837 | A1 | 4/2012 | Swett |

FOREIGN PATENT DOCUMENTS

| | | | | |
|---|---|---|---|---|
| WO | WO-2005076040 | A1 * | 8/2005 | ............... G01V 1/52 |
| WO | 2015/130296 | A1 | 9/2015 | |

* cited by examiner

SYSTEM AND METHOD FOR BROADBAND ACOUSTIC SOURCE

CROSS-REFERENCE TO RELATED APPLICATIONS

This application claims priority to and the benefit of U.S. Provisional Patent Application No. 63/356,725, filed Jun. 29, 2022, and titled "SYSTEM AND METHOD FOR BROADBAND ACOUSTIC SOURCE," the full disclosure of which is hereby incorporated by reference in its entirety for all purposes.

BACKGROUND

1. Field of the Disclosure

The present disclosure relates to a system and method for generating an acoustic signal. Specifically, the present disclosure relates to a broadband acoustic source.

2. Description of Related Art

Oil and gas production may involve downhole measurement operations where various sensors are utilized to collect data for determining one or more wellbore properties. For acoustic sensing operations, an acoustic transmitter may emit a signal and an acoustic receiver may receive the signal after it reflects off of fluid, the surrounding rock formation, and/or the wellbore. Transmitters are often tuned to a special resonance frequency, and as a result, may sacrifice output over different frequency ranges.

SUMMARY

Applicant recognized the limitations with existing systems herein and conceived and developed embodiments of systems and methods, according to the present disclosure, for improved acoustic sources.

In an embodiment, an acoustic device emits acoustic energy in a broad frequency band by tuning it to several specific natural frequencies and thus creating a broadband response with increased efficiency. In at least one embodiment, a sound emitting member is configured to include a number of masses and springs to create a desired frequency response to an excitation. Embodiments may provide for using the sound emitting member to mechanically preload the actuator and also to protect and seal the internals of the acoustic device against a borehole environment. In operation, the amount of mechanical preload may be used to influence the frequency response of the source. Systems and methods may further provide for different material configurations. For example, systems and methods may combine materials such that the desired natural frequency is achieved and at the same time negative effects from temperature changes are compensated, among other benefits. Various embodiments, utilize coupling plates with a dedicated material and geometry to influence the frequency response from the acoustic device. The volume and composition of the compensation medium are chosen with respect to the pressure compensation function as well as the frequency response of the acoustic device and the temperature characteristics.

One or more embodiments provide for a sound emitting member excited by an actuator with one or more certain frequencies. The sound emitting member vibrates with the excitation frequency and emits acoustic energy. The sound emitting member may have one or more natural frequencies, which may be tuned or depend on one or more included masses and springs. The natural frequencies of the acoustic device are determined by a variety of factors, including but not limited to, a choice of actuator, materials used to form the device, and masses and springs included within the device, as well by the geometry of the included parts. If excited at or close to those natural frequencies, the emitted sound energy amplitude increases compared to when excited farther away from those natural frequencies, thus increasing efficiency. When operated over the full frequency range, the acoustic energy output is more broadly distributed into desired bands, instead of being concentrated into a single natural frequency. In various embodiments, the sound emitting member and its fixation to the carrier can be designed to put the sound emitting member under mechanical stress and by that compressing the actuator. It should be appreciated that the choice of materials and geometries may be particularly selected to compensate negative temperature effects. As will be described herein, a piston or membrane transmits the pressure from outside to inside of the acoustic device to create a pressure equilibrium.

In an embodiment, an acoustic transmitter system includes a carrier, a sound emitting member secured to the carrier, and an actuator configured to transmit energy to the sound emitting member. The sound emitting member includes a first mass coupled to the carrier by a first spring and a second mass coupled to the first mass by a second spring.

In an embodiment, a method for making acoustic measurements in a wellbore environment includes disposing an acoustic receiver into a wellbore and disposing an acoustic transmitter system into the wellbore. The acoustic transmitter system includes a carrier, a sound emitting member secured to the carrier, and an actuator configured to transmit energy to the sound emitting member. The sound emitting member includes a first mass coupled to the carrier by a first spring; and a second mass coupled to the first mass by a second spring. The method further includes emitting an acoustic wave from the sound emitting member into the wellbore in response to the energy transmitted from the actuator; and receiving a received acoustic wave, at the receiver, in response to the emitted acoustic wave.

In an embodiment, a system includes a carrier, a sound emitting member secured to the carrier, and an actuator. The sound emitting member includes a first mass coupled to the carrier, a second mass coupled to the first mass, and spring portions which couple the first mass, the second mass, and the carrier. The actuator configured to transmit energy to at least the first mass.

In an embodiment, a system includes a first mass, a second mass coupled to the first mass and an actuator positioned to transmit a force to at least the first mass. The second mass is coupled to the first mass, at least in part, by a second spring portion, and further wherein responsive to the force, the first mass resonates at a first frequency or a second frequency, the first frequency corresponding to a combined vibration of both the first mass and the second mass and the second frequency corresponding to a single vibration of the first mass.

In an embodiment, a method includes securing a first mass to a carrier using a first spring portion, securing a second mass to the first mass using a second spring portion, applying a force, to the first mass, via one or more actuators; and causing at least one of the first mass or a combination of the first mass and the second mass to emit an acoustic wave based, at least in part, on a selected operational frequency of the one or more actuators.

BRIEF DESCRIPTION OF DRAWINGS

The present technology will be better understood on reading the following detailed description of non-limiting embodiments thereof, and on examining the accompanying drawings, in which.

DETAILED DESCRIPTION

Figure 1:
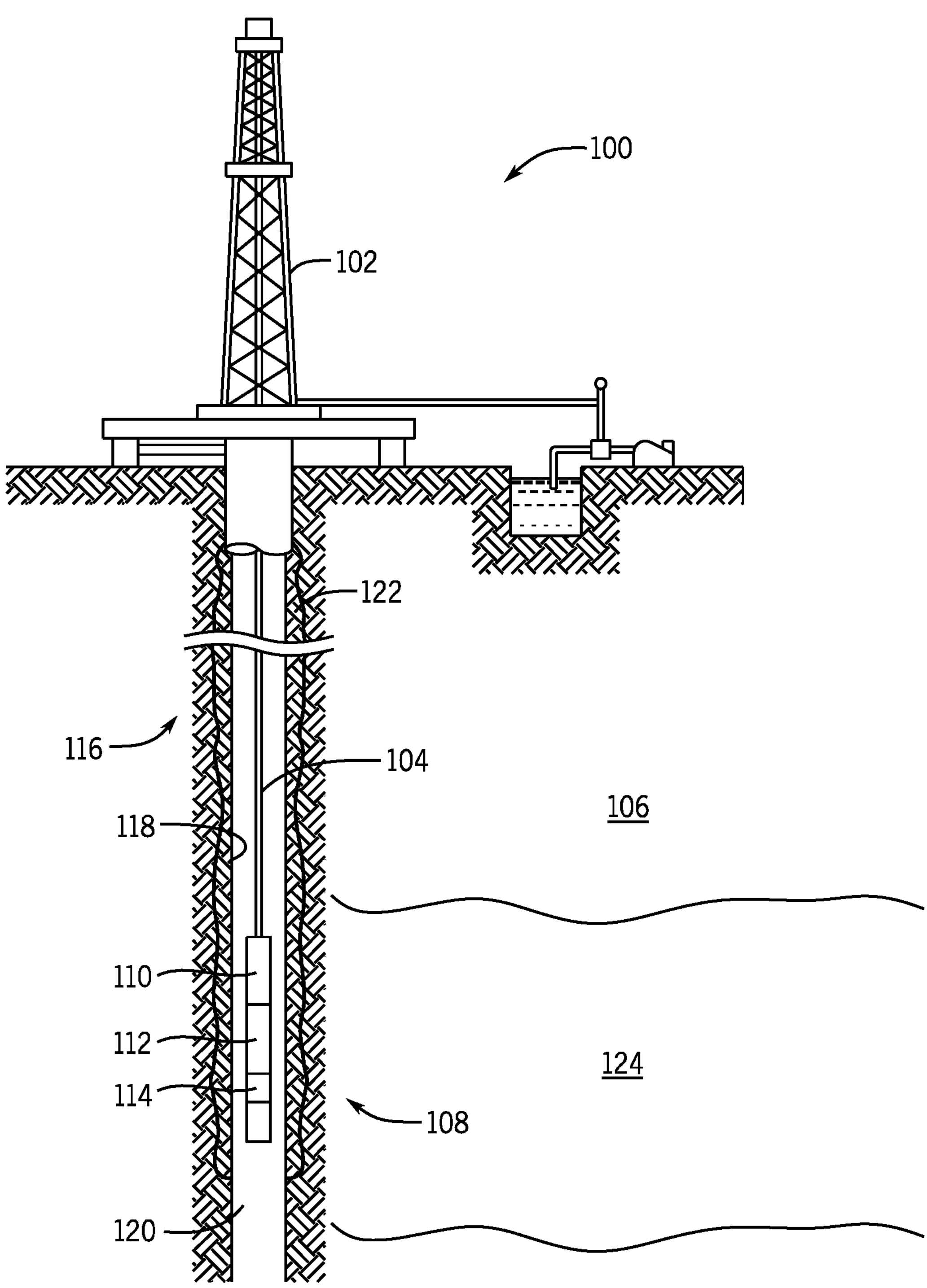
FIG. 1 is a cross-sectional side view of an embodiment of a drilling system, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose. Additionally, reference numerals may be reused for similar features between figures, however, such use is not intended to be limiting and is for convenience and illustrative purposes only.

When introducing elements of various embodiments of the present disclosure, the articles “a”, “an”, “the”, and “said” are intended to mean that there are one or more of the elements. The terms “comprising”, “including”, and “having” are intended to be inclusive and mean that there may be additional elements other than the listed elements. Any examples of operating parameters and/or environmental conditions are not exclusive of other parameters/conditions of the disclosed embodiments. Additionally, it should be understood that references to “one embodiment”, “an embodiment”, “certain embodiments”, or “other embodiments” of the present disclosure are not intended to be interpreted as excluding the existence of additional embodiments that also incorporate the recited features. Furthermore, reference to terms such as “above”, “below”, “upper”, “lower”, “side”, “front”, “back”, or other terms regarding orientation or direction are made with reference to the illustrated embodiments and are not intended to be limiting or exclude other orientations or directions. Moreover, terms such as “approximately” or “substantially” may mean+/−10%.

Acoustic Downhole Tools are used to determine one or more formation characteristics. In operation, these tools may emit acoustic waves, via source or transmitter, and these waves, or reflections of the waves, are then received and recorded at one or more receivers. Acoustic waves may leave the tool, enter wellbore fluid (also referred to as mud or drilling mud) surrounding the tool, and then reflect off of the fluid and/or off of the formation, such as off of a wall of a wellbore. In certain configurations, piezo ceramic elements (e.g., piezo elements, acoustic elements, etc.) may be used to generate or emit acoustic waves directly, or impulses may be transmitted to an element (e.g., a piston or a membrane) which is in contact with the wellbore fluid. Additionally, certain piezo ceramic drivers (e.g., piezo driver, driver, etc.) are mechanically preloaded to stay in compression. Embodiments of the present disclosure may combine preloading of a piezo driver and emitting acoustic energy into an element. In at least one embodiment, a broadband frequency spectrum is enabled. For example, the acoustic source of the present disclosure may provide acoustic energy with high amplitudes (e.g., above a threshold level) in one or more frequencies or ranges of frequencies. Embodiments of the present disclosure may provide an acoustic source that emits a broadband frequency response by incorporating two or more elastic mounted masses that are tuned via springs to resonate at different natural frequencies. Springs in this context may also be flexible portions of solid bodies. Systems and methods may overcome problems with existing systems where sources are tuned to operate at a specific frequency and/or where sources operate at low power over a range of frequencies. For example, systems tuned to a particular resonance frequency, or a range may have improved efficiency and increased energy output, but are limited to those particular frequencies. Additionally, systems tuned to operate over a broader range may have a flat, relatively low energy output. Systems and methods of the present disclosure are directed toward a source that has two or more resonances, thereby enabling relatively high energy output at a variety of different frequencies and/or ranges.

In at least one embodiment, two or more mounted masses are positioned within an element which transmits energy from a piezo ceramic to a wellbore fluid. By the combination of masses, along with potentially variable spring stiffnesses, the excitation will cause two or more of the mounted masses to vibrate with different resonance frequencies, thus causing a broadband frequency response in comparison to a single source with a single mass element. Moreover, in various embodiments, the masses may vibrate in phase with the exciting driver, which minimizes the stress on the piezo material.

Presently, acoustic sources that are based on the design of a multilayer piezo actuator are either tuned to a special resonance frequency to maximize output in that frequency range while sacrificing output in another. Additionally, tuning may also set the source to be used far below resonance to achieve an equally distributed energy output over the complete frequency range. The former situation suffers from low output in frequencies away from the resonance and out-of-phase vibration above the resonance. The latter suffers from a generally low pressure output. Embodiments of the present disclosure overcome these problems by including a number of masses (e.g., two or more vibrating masses) within a single source. The number of masses may be two masses in certain embodiments, but it should be appreciated that systems and methods may include more or fewer masses. For example, three, four, five, six, or any reasonable number of masses may be used. Furthermore, a single mass may be used in a way that simulates two different masses, such as due to the presence of one or more springs and/or application energy to different parts of a single mass to increase a surface area that experiences the energy. Additionally, in one or more embodiments, manufacturing and assembly problems associated with using two or more elastic mounted masses are further addressed. Current manufacturing methods, such as turning or milling a singular component, may be difficult or too limited to create the necessary contours, shapes, surface areas, and/or weights. Furthermore, additive manufacturing processes may be challenging due to insufficient surface quality, which could be rectified with turning or milling, but as noted above, has another set of problems. Additionally, assembly may be challenging because mounting of the bodies in an incorrect way may alter the calculated spring stiffnesses, which is undesirable. Systems and methods of the present disclosure, in at least one embodiment, overcome these drawbacks by forming the element as two separate components with mating features to enable assembly. For example, one part may snap or otherwise connect to another. Additionally, parts may be formed with an interference fit such that expansion maintains their connected arrangement. Furthermore, in one or more embodiments, components may be formed with high radial contact pressure to enable different coupling methods, such as screwing parts together, gluing, welding, soldering, and the like. Additionally, in at least one embodiment, parts may be formed as integrated or otherwise continuous structures that are particularly selected to address the above-referenced drawbacks, such as providing springs between different mass areas, shaping the areas to facilitate manufacturing, and the like.

One or more embodiments of the present disclosure may be utilized with one or more downhole services, such as a logging while drilling (LWD) application or a wireline application. These services may benefit from stronger energy output over a larger frequency range. By way of example, a complete range of 2 to 15 kHz may be provided with increased overall signal to noise ratios. Additionally, the efficiency of various systems and methods may increase since exciting the source closer to resonance is easier. Furthermore, the reliability of such an acoustic source may be increased due to the reduced mechanical stresses by operating with in-phase vibration. In at least one embodiment, systems and methods may be configured as one or more removable modules that can be added to a portion of a string associated with downhole services, such as a drill string or a drill string. Furthermore, various embodiments may be integrally formed or otherwise positioned directly within one or more recesses of the drill string.

FIG. 1 is a schematic side view of an embodiment of a wellbore system 100 including a rig 102 and a drill string 104 (e.g., drill string) extending into a formation 106. It should be appreciated that while various embodiments may be discussed with reference to the illustrated wellbore system 100, other embodiments may include other wellbore systems that may include wirelines, coiled tubing, and the like. Accordingly, discussion with reference to drill strings 104 is for illustrative purposes only. For example, in one or more embodiments, systems and methods described herein may be used in other phases of wellbore operations and are not limited to evaluation and/or drilling. The illustrated drill string 104 is formed from a plurality of tubulars joined together, for example via threads, and extends into the formation 106 to a bottom hole assembly (BHA) 108. In the illustrated embodiment, the BHA 108 includes a plurality of downhole tools, such as measurement modules, which may also be referred to as subs, such as an acoustic transmitter 110 or an array of acoustic transmitters (e.g., acoustic source, array of acoustic sources), an isolator 112, and an acoustic receiver 114 or an array of acoustic receivers. In various embodiments, the BHA 108 may include additional or fewer units, and further, may be utilized to conduct one or more downhole measurement operations. Additionally, it should be appreciated that the drill string 104 may include various other components, which have been removed for simplicity and clarification with the discussion herein. Furthermore, while embodiments may be discussed with reference to evaluation operations, in other embodiments the measurements may be conducted during logging periods, intervention periods, drilling periods, off-bottom periods, non-rotating periods, and the like.

As illustrated in FIG. 1, in various embodiments a borehole or wellbore 116 extends into the formation 106 and includes a borehole wall 118 and an annulus 120 arranged between the BHA 108 and the borehole wall 118. In certain embodiments, during formation of the wellbore 116, the drill string 104 may be a drill string that includes a drill bit (not shown) that is driven to rotate. In various embodiments, fluid such as drilling mud may be pumped through the drill string and through the drill bit, where the drilling mud may infiltrate the formation 106 in a near-borehole zone 122. It should be appreciated that while the illustrated embodiment includes a configuration to facilitate drilling (e.g., by use of a mud pit and the like), systems and methods may be described with reference to logging or evaluation, but are not limited to such embodiments, as noted herein.

In various embodiments, the BHA 108 may be utilized to determine the location of a recoverable zone 124 within the formation 106 or to determine one or more formation properties that may lead to identification of one or more recoverable zones 124. The recoverable zone 124 may refer to a region of the formation 106 that includes recoverable hydrocarbons, or any other region of interest like for example fracture systems for geothermal or other formation boundaries. Additionally, while not illustrated in FIG. 1, the wellbore 116 may also be curved or deviated, and not straight, thereby providing additional stresses and strains on the drill string 104.

As will be described below, in one or more embodiments the acoustic source 110 may emit acoustic energy into the formation that is received by the acoustic receiver 114, for example after it reflects off of the fluid within the annulus 120 or off of the borehole wall 118. While such measurements may provide information regarding properties proximate the borehole wall 118, it may be desirable for acoustic position logging to penetrate deeper into the formation 106. Embodiments of the present disclosure may provide a source that emits low frequency waves at a sufficient energy to penetrate further into the formation 106, for example beyond the near-borehole zone 122.

Figure 2:
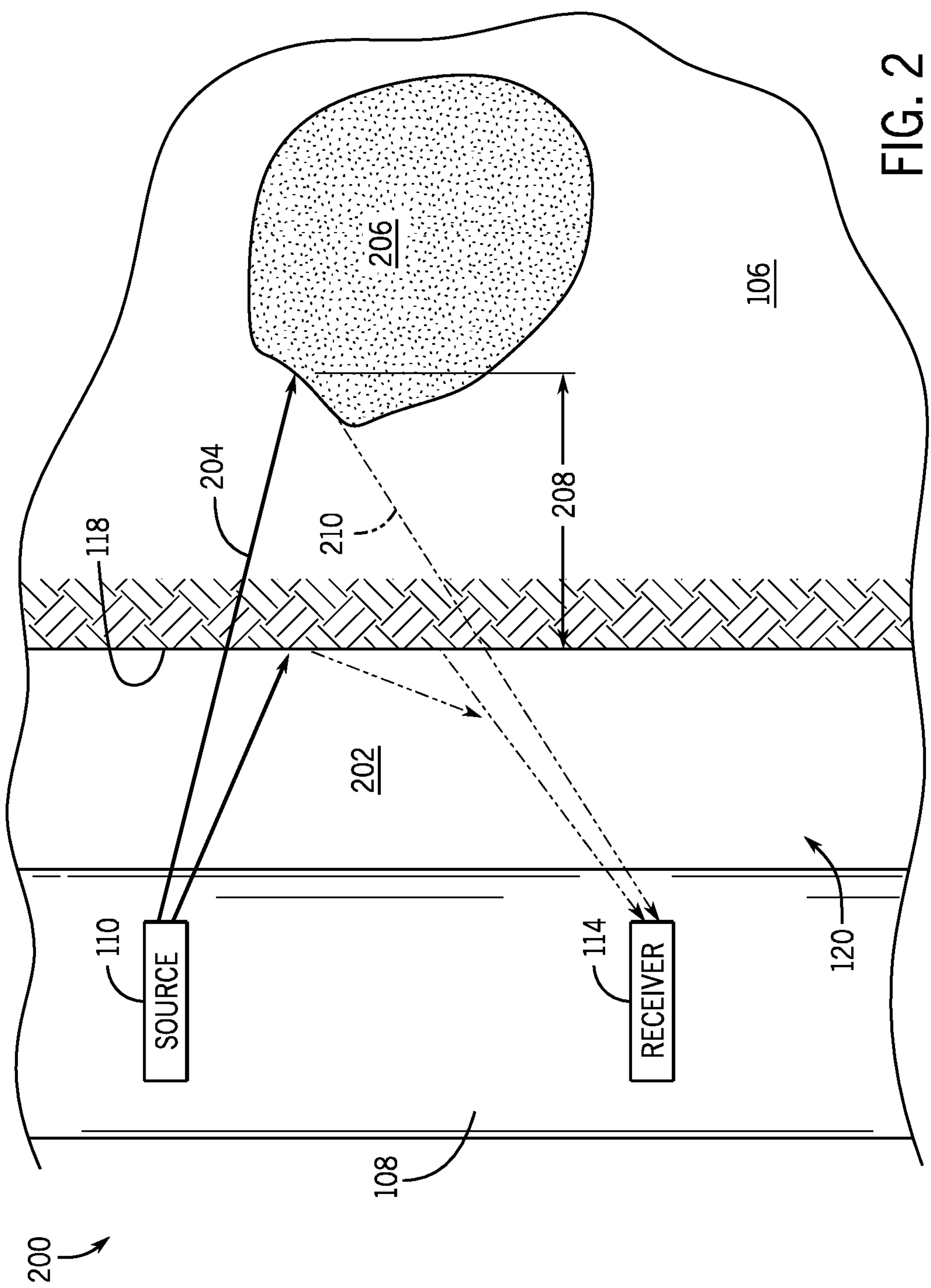
FIG. 2 is a schematic diagram of an embodiment of a downhole environment for acoustic data acquisition, in accordance with embodiments of the present disclosure.

FIG. 2 is a schematic diagram of an example of a downhole data acquisition environment 200 where one or more acoustic systems are utilized to obtain one or more formation properties, for example based, at least in part, on an acoustic signal. In this example, the BHA 108 is arranged within the wellbore 116 to form annulus 120 with borehole wall 118, wherein annulus 120 is filled with fluid 202. The acoustic source 110 emits a signal 204 (e.g., a sound wave) outwardly from the body of the BHA 108. The signal 204 may interact with one or more components, such as the fluid 202, the borehole wall 118, the formation 106, or a formation section 206. In at least one embodiment, the formation section 206 is arranged a distance 208 beyond the borehole wall 118, and as noted above, may be at a location that is traditionally difficult to measure with existing acoustic tools.

In the illustrated embodiment, the signal 204 reflects off of the components and reflections 210 may be captured by the acoustic receiver 114 for analysis. In one or more embodiments, the acoustic receiver 114 includes an array of receivers extending over a longitudinal length of the BHA 108 such that different receivers of the array may receive different reflections 210. As will be described below, embodiments of the present disclosure may be directed toward the acoustic source 110 to emit a broadband acoustic spectrum to provide information to analyze one or more properties of the formation 106.

Figure 3A:
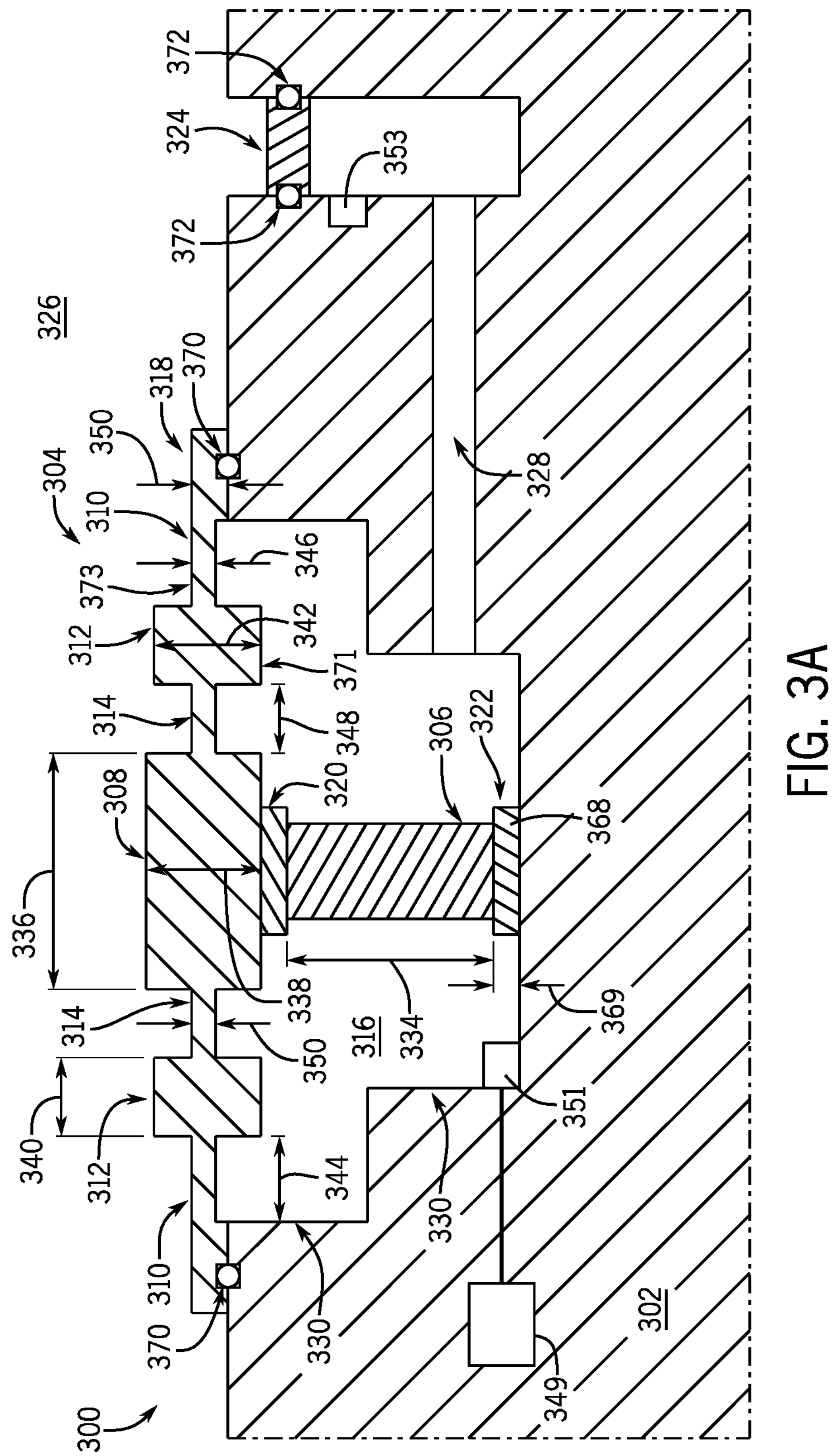
FIG. 3A is a schematic cross-sectional view of an embodiment of an acoustic device, in accordance with embodiments of the present disclosure.

FIG. 3A is a cross-sectional schematic diagram of an embodiment of an acoustic device 300, which may be used with embodiments of the present disclosure. It should be appreciated that various features may be simplified or omitted for clarity and conciseness with the present disclosure. Various embodiments may be utilized with the BHA 108 and/or any downhole tool that includes one or more locations to mount the acoustic device 300. The mounting location may be a recess or any other surface. The acoustic device can comprise a carrier 302 or use the downhole tool as a carrier. The acoustic device 300 may therefore be removable from the BHA 108, which may facilitate maintenance and repairs because the used carrier 302 may be wholly removed and replaced with a different acoustic device 300 while the used carrier 302 undergoes maintenance and repairs. Additionally, as noted herein, various embodiments may include one or more modules or string sections in which one or more features of the acoustic device 300 are integrated into the module or string section.

In at least one embodiment, the acoustic device 300 includes a sound emitting member 304. The illustrated sound emitting member 304 may be formed from one or more components and may collectively refer to as a combination of a first mass 308, a first spring 310, a second mass 312, a second spring 314, and a fixing member 318. The fixing member 318 may be used to couple the sound emitting member 304 to the carrier 302 and/or the tool body. In at least one embodiment, the sound emitting member 304 may be directly coupled to the carrier 302 and/or the tool body. In at least one embodiment, the sound emitting member 304 may be indirectly coupled to the carrier 302 and/or the tool body. For example, direct coupling may refer to one or more manufacturing processes, clips, recesses, and/or the link to form a connection between the sound emitting member 304 and the carrier 302 and/or the tool body, while indirect coupling may refer to the use of one or more fasteners or the like. Furthermore, combinations of the two may be used. In operation, the sound emitting member 304 may emit acoustic energy in a desired frequency range, create and sustain a desired preload on the actuator, and seal and protect the internals against and from an outer wellbore environment 326, such as fluid 202, borehole wall 118, and/or formation 106.

As shown in FIG. 3A, embodiments may include pairs of springs 310, 314 between different masses 308, 312 and/or between one or more of the masses 308, 312 and the carrier 302 and/or a region of the drill string. By way of non-limiting example, the first mass 308 is associated with the second spring 314 extending between the first mass 308 and the second mass 312 (which may be a circular or annular mass that surrounds the first mass 308), where the second mass 312 may be considered radially outward from the first mass 308 (in embodiments where the second mass 312 is annular) and/or displaced longitudinally outward from the first mass 308 along an axis of the carrier 302 (in embodiments where the second mass 312 is segmented or otherwise arranged). Such a configuration, however, is for illustrated purposes only because the different masses 308, 312 may be stacked (e.g., axially centered) relative to one another, offset axially, and/or the like. Accordingly, the masses 308, 312 may be positioned such that an applied force is applied to one or more of the masses 308, 312, either directly or via connections using the one or more springs 310, 314. As used herein, the springs 310, 314 may refer to one or more resilient members that are used to exert tension or force and/or to absorb movement. As such, the springs 310, 314 may have less mass than and/or a different surface area than the masses 308, 312. In at least one embodiment, the springs 310, 314 may be formed from a different material. However, it should be appreciated that the springs 310, 314 may be formed from the same material as the masses 308, 312 and may also be integrally formed with the masses 308, 312 such that the springs 310, 314 are used to dampen or otherwise absorb movement, which may be tuned based, at least in part, on a mass or surface area, among other features, of the masses 308, 312 and/or the springs 310, 314. By way of example, different thicknesses may be selected for the masses 308, 312 and/or the springs 310, 314, thereby influencing how an externally applied force affects the masses 308, 312 and/or the springs 310, 314. Without deviating from the scope of this disclosure one or more of the inner surface 371 and the outer surface 373 may be coated.

In at least one embodiment, the sound emitting member 304 may be manufactured as one piece by conventional machining or additively produced or assembled from several parts. Additionally, embodiments may include configurations where portions are manufactured by conventional machining and portions are additively produced. Various embodiments may include at least one portion that acts primarily as a mass (e.g., first mass 308 and/or second mass 312) and at least one portion that acts primarily as a spring (e.g., first spring 310 and/or second spring 314). Furthermore, additional mass or spring portions may be included within the scope of the present disclosure.

As shown in FIG. 3A, the fixing member 318 has a contact surface to the carrier 302 and is suited to be fixed to the carrier 302, while coupling plate 320 has a contact surface with the actuator 306. In at least one embodiment, the contact surfaces can be flat, convex, concave or tapered. Furthermore, fixing the sound emitting member 304 to the carrier 302 can be realized using one or more of: welding, brazing, screwing, clamping, or combinations thereof. Additionally, while the illustrated embodiment shows the fixing member 318 on a surface location of the carrier 302, it should be appreciated that the fixing member 318 may also be positioned within a recessed portion, within a void, or any other reasonable location to facilitate securing one or more components to the carrier 302 and/or an associated sub or module.

As noted above, various different configurations may provide for one or more parts to be formed from different materials, where materials may be particularly selected based on one or more properties associated with their acoustic response and/or with the expected wellbore environment 326. For example, one or more materials may have the following characteristics: insensitive against corrosive environment, flexible to act as spring, strong enough to withstand compressional and tensional stress, and fatigue resistant. In addition, FIG. 3A shows a symmetric arrangement of springs 310, 314 and masses 308, 312 with respect to the center line of actuator 306. However, this is not meant to be a limitation as other configurations would be also possible. An asymmetric arrangement of springs and masses about the center line of actuator 306 would be also possible.

For example, in FIG. 3A, the actuator 306 could also be positioned to actuate a portion of second mass 312, leaving the first mass 308 and the remainder of the second mass 312 unsupported to allow free oscillation of first mass 308 and the remainder of the second mass 312.

In at least one embodiment, the sound emitting member 304 may be assembled from several parts and the connections can be made by any or a combination of screwing, welding, brazing, gluing, clamping, soldering, or shrink fitting. The actuator 306 may refer to one or more devices to transmit energy into the sound emitting member 304 (e.g., into one or more components of the sound emitting member). The actuator 306 may be one or more of a magnetostrictive material, a piezoelectric material, a voice coil, or any linear or rotary drive. Furthermore, it should be appreciated that the actuator 306 can consist of several individual actuators 306. That is, the actuator 306 may be a combination of one or more actuators 306, with different actuators 306 being selectively utilized based, at least in part, on operating conditions. Furthermore, in various embodiments, redundancy may be provided by using more than one actuator 306. Additionally, the actuators 306 may be arranged at different locations relative to the first mass 308 and/or the second mass 312 in order to apply forces at different locations, which may influence responses of the masses 308, 312 and/or the springs 310, 314.

Various embodiments of the present disclosure include the coupling plates 320, 322 shown positioned between one or more of the sound emitting member 304, actuator 306, and/or carrier 302. Additionally, the coupling plates 320, 322 may also be positioned between various adjacent parts. While the illustrated embodiment may show substantially flat or planar coupling plates 320, 322, it should be appreciated that the contact surfaces of the coupling plates 320, 322, can be flat, concave, or convex. In at least one embodiment, the coupling plates 320, 322 are made of a material that has a density, mechanical strength and thermal characteristic which is beneficial for the acoustic device. For example, a high mechanical strength, such as a mechanical strength that is higher than one or more of the first mass 308, the second mass 312, the first spring 310, and/or the second spring 214, may be beneficial for at least one of the coupling plates 320, 322 to withstand the preload that acts on the coupling plates 320, 322 and the actuator 306. Furthermore, a high thermal expansion coefficient of at least one of the coupling plates 320, 322, such as a thermal expansion coefficient that is higher than the actuator 306 or one or more of the first mass 308, the second mass 312, the first spring 310, and/or the second spring 314 may be beneficial to compensate for a difference in the thermal expansion coefficient of the actuator 306 and one or more of the first mass 308, the second mass 312, the first spring 310, and the second spring 314 of the sound emitting member 304. For example, bronze is a material that has a high thermal expansion coefficient and advantageously may be used to make the coupling plates 320, 322 from it, but this is provided as only one non-limiting example and various other materials may be used within the scope of the present disclosure.

In this example, the acoustic device 300 is filled with a pressure compensation medium 316 (e.g., oil, such as hydraulic oil) that is connected via a moving piston or a flexible membrane 324 (e.g. a membrane made of rubber or metal thin enough to allow sufficient flexibility) to the wellbore environment 326. For example, a passage 328 may extend from void 330 to the wellbore environment 326, where flow between the passage 328 and the wellbore environment 326 may be restricted by the moving piston or a flexible membrane 324. In at least one embodiment, the moving piston or flexible membrane 324 may be tuned based, at least in part, on a desired pressure within the void 330. However, in other embodiments, one or more control systems 349 may be used to regulate the pressure of the void 330, such as sensing a pressure within the void 330 by a sensor 351, determining or preselecting a desired pressure, a pressure threshold, or a pressure range, processing, by the one or more control systems 349, the sensed pressure within the void 330 and then sending, by the one or more control systems 349, a signal (e.g., a control signal) that contains one or more instructions to change or adjust the pressure within the void 330 to match the preselected or desired pressure, pressure threshold, or pressure range based on the sensed pressure). The instructions may cause a pressure adjustment actuator 353 to compress or expand the volume of the passage 328 via the piston, flexible membrane, a valve, or the like. Alternatively, the pressure adjustment actuator 353, (e.g., a pump) may add or remove compensation fluid to the void 330 (for example, from a pressure compensation fluid reservoir, not shown) to increase or decrease the pressure in the void 330 to match the preselected or desired pressure, pressure threshold, or pressure range. That is, the preload may be created, at least partially by a pressure difference between the pressure in the pressure compensation medium 316 and the pressure in the wellbore environment 326 that may be created and maintained by the pressure adjustment actuator 353.

As noted above, the sound emitting member 304 is excited by the actuator 306 with a certain frequency, for example via transfer of energy between the first coupling plate 320 and the actuator 306. As a result, the sound emitting member 304 vibrates with an excitation frequency and emits acoustic energy. The sound emitting member 304 may have one or more natural frequencies, which may be dependent, at least in part, on the masses (e.g., the first mass 308 and the second mass 312) as well as the springs (e.g., the first spring 310 and the second spring 314). That is, the one or more natural frequencies may be dependent on the choice of actuator, the choice of materials, the choice of masses, and the choice of springs, as well as the geometry of the various components. In operation, if the sound emitting member 304 is excited at or close to one of the one or more natural frequencies, the emitted sound energy amplitude is increased, which provides an increased efficiency. It should be appreciated that over a full frequency range, the acoustic energy output is more broadly distributed into desired bands, rather than being concentrated into a single natural frequency.

In at least one embodiment, systems and methods enable pre-compression or preload of the actuator 306 and/or the sound emitting member 304, for example by placing the actuator 306 and/or the sound emitting member 304 under mechanical stress, which may compress or otherwise apply a force to the actuator 306 and/or the sound emitting member 304 even at a time when the actuator 306 is not actuated. That is, when assembling acoustic device 300, the sound emitting member 304 will be attached to the carrier 302 by the one or more fixing members 318. Attaching sound emitting member 304 to carrier 302 will engage sound emitting member 304 with one or more of coupling plates 320, 322 and/or with actuator 306 thereby creating a force to coupling plates 320, 322 and/or actuator 306 by the sound emitting member 304 and a reactive force to the sound emitting member 304 by the one or more of coupling plates 320, 322 and/or the actuator 306. The reactive force to the sound emitting member 304 may cause a deflection of one or more of the first and second spring 310, 314 which in turn create the force to the coupling plates 320, 322 and/or the actuator 306. The force to coupling plates 320, 322 and/or actuator 306 and the reactive force to the sound emitting member 304 may act at times when actuator 306 is actuated and when it is not actuated. The amount of pre-compression or preload can be adjusted by the dimensions of the coupling plates 320, 322, the actuator 306 and/or the sound emitting member 304. For example, by using coupling plates 320, 322, actuator 306 and/or sound emitting member 304 of greater/smaller thicknesses (e.g., first mass thickness 338 or actuator height 334, or thickness of one or more of coupling plates 320, 322), the force and the reactive force (i.e., the pre-compression/preload of actuator 306 and/or one or more of first and second spring 310, 314) can be increased/decreased. Notably, one or more of the eigen frequencies of the sound emitting member 304 may depend on the amount of pre-compression or preload. This allows to tune one or more eigen frequencies of the sound emitting member 304 by selecting coupling plates 320, 322, actuator 306 and/or the sound emitting member 304 of a thickness that results in the desired one or more eigen frequencies of the sound emitting member 304. Such a configuration may be advantageous, at least in part, with certain actuators, such as piezo elements that may be considered highly dynamic. Maintaining compression may reduce a likelihood of damage to the piezo element. For example, by applying the compressive stress to the piezo element, only or substantially only compressive stress and no, or substantially no, tensile stress acts on the piezo element, even while an electric charge is applied. This is advantageous because tensile stress could damage the ceramic. Moreover, the pre-compression or preload of actuator 306 and/or one or more of first and second spring 310, 314 may also be applied in various situations such as to compensate for anticipated thermal expansion of other components. As noted above, such an example is provided for non-limiting purposes and various other actuators may be utilized and, moreover, compressive forces may also be used with different types of actuators to provide similar or different benefits.

For manufacturing and/or reliability purposes, various materials and geometries may be chosen, at least in part, to compensate for negative temperature effects, among other reasons, such as to tune or adjust the one or more frequencies.

In operation, pressures within the void 330 may be self-balancing (e.g., passive). For example, as pressure increases, the pressure compensation medium 316 may be driven toward the passage 328. In at least one embodiment, the pressure in the pressure compensation medium 316 may be adjusted via the moving piston or a flexible membrane 324 in response to the pressure in the wellbore environment 326 and to balance the pressure in the wellbore environment 326. For example, the moving piston or a flexible membrane 324 transmits pressure from outside of the acoustic device 300 (e.g., from the wellbore environment 326) to an inside of the acoustic device 300 (e.g., to a chamber of volume defined by the carrier 302 and the sound emitting member 304 labeled as the void 330). This pressure may be increased or decreased in order to create a pressure equilibrium between the pressure in the pressure compensation medium 316 and the pressure in the wellbore environment.

Embodiments of the present disclosure may be utilized to create the acoustic device 300 to emit acoustic energy in a broad frequency band by tuning the acoustic device 300 to several specific natural frequencies, thus creating a broadband response with increased efficiency. Accordingly, the incorporation of the various masses 308, 312 and springs 310, 314, along with particularly selected materials and geometries, a desired frequency response may be generated responsive to an excitation. Furthermore, embodiments provide for a configuration where the sound emitting member 304 may preload the actuator 306 and also protect and seal the internal components against the wellbore environment 326, for example by one or more seals 370 at fixing member 318 and/or one or more seals 372 at membrane or piston 324. That is, the sound emitting member 304 has actually three different functions which are the emission of acoustic waves at more than one frequency (e.g., more than one resonance frequency or eigen frequency) when actuated by actuator 306, the separation of void 330 from the wellbore environment 326 (i.e., the isolation of void, actuator, electronics from wellbore fluid, and preloading actuator 306, and the one or more springs 310, 314. Advantageously for manufacturing, these functions can all be provided simultaneously when the sound emitting member 304 is made of one integral part made from the same material. In various configurations, the amount of mechanical preload may further influence the frequency response. Further tuning of the acoustic device 300 may be provided by the selection of materials (as noted above), the geometries of various components, and the choice and volume of the pressure compensation medium 316.

In at least one embodiment, the illustrated acoustic source or acoustic device 300 may include two or more masses that are positioned to vibrate at different frequencies to produce acoustic waves within a downhole environment to obtain one or more properties of a downhole formation. In operation, resonance may be a function of stiffness and mass, where an increased mass leads to a decreased frequency. Systems and methods may be directed toward two or more masses that operate at different frequencies, thereby enabling emission at high and low frequencies using a common source with a single actuator 306.

It should be appreciated that various components may be described with reference to individual or separate parts, but in various embodiments parts may be segmented for joined together. Furthermore, additional components may be incorporated that have been removed for clarity, such as, one or more electrical components to drive a piezo material and/or send and receive signals. By way of example only, one or more electrical systems may include a coil or magnetostrictive element that receives one or more inputs (e.g., an electrical input) to cause vibration or deformation, which may be transmitted to another element or directly into the wellbore fluid. Adjustments to this frequency may drive movement of the one or more masses, thereby producing acoustic waves.

The illustrated acoustic device 300 includes carrier 302, which may also be referred to as a body or support. The carrier 302 includes a recess 332 (e.g., recessed portion) that receives the sound emitting member 304. The sound emitting member 304 may also be referred to as an element that receives energy to generate an acoustic signal. In one or more embodiments, the sound emitting member 304 may incorporate two or more masses, two or more springs, coupling plates, and the like.

In this example, positioned within the recess 332 is the actuator 306 that may provide an input force to the sound emitting member 304, such as from the actuator 306 (e.g., piezo ceramic actuator, piezo element, piezo, etc.) to the first mass 308. While piezo material is provided as an example, other embodiments may include other actuators, such as a voice coil or a magneto restrictive material, among other examples. In examples where the actuator 306 is a piezo actuator, the piezo actuator may be a multilayer piezo element that includes piezo slices with electrodes positioned between the slices. Such an arrangement may enable lower voltage operation while still providing sufficient expansion for operation within the system.

As noted above, in one or more embodiments, the actuator 306 is maintained under compression during operation. In at least one embodiment, one or more compression fasteners are utilized to secure one or more components to the carrier 302. For example, a compressive force, pre-compression, or preload may be applied to the sound emitting member 304, via fasteners, which transmits the compression against the first coupling plate 320 and then to the actuator 306. It should be appreciated that various other components, may also be utilized to compress the actuator 306 and that the fasteners are described by way of example only. For example, in at least one embodiment, compression may be applied via the fixing member 318. Additionally, one or more additional compressive members may be positioned within the recess 332, for example to secure to one or more portions within the recess 332. Additionally, in various embodiments, respective thicknesses of the coupling plates 320, 322 may be selected based on one or more operational conditions or desired operating configurations. For example, the coupling plates 320, 322 may be selected based on their thickness to achieve a desired compressive force, pre-compression, or preload on the sound emitting member 304 and/or the actuator 306. Selection of the coupling plates 320, 322 may be based on the wellbore environment 326 in which the acoustic device 300 is operated. For example, selection of the coupling plates 320, 322 may be based on the slowness of the formation, the mud type, etc.

In at least one embodiment, the acoustic device 300 enables operation in a broad frequency range. In single frequency devices, one mass is mounted in a flexible manner to enable oscillation once excited. The frequency of oscillation is defined by the mass and the spring elasticity. The spring elasticity is given by the Young's modulus of the chosen material and the geometry of the spring zone. Additionally, the device itself may be used to preload piezo ceramic actuators. As a result, only or substantially only compressive stress and no, or substantially no, tensile stress acts on the piezo ceramic actuator, even while an electric charge is applied. This is advantageous because tensile stress would damage the ceramic.

To generate a broadband device according to embodiments of the present disclosure, two masses (e.g., the first mass 308 and the second mass 312) are mounted such that both are flexible, e.g. connected by one or more springs. Furthermore, additional masses may also be used. A first spring (e.g., the first spring 310) supports both masses (e.g., the first mass 308 and the second mass 312) together and a second spring (e.g., the second spring 314) supports a single mass (e.g., the first mass 308) of the pair. As a result, the pair of masses can oscillate with the eigenfrequency of their combined elasticity and a single mass can oscillate with its own eigenfrequency. Each of these is determined by the participating masses and spring elasticities including the compressibility of pressure compensation medium 316. In essence, the sound emitting member 304, together with pressure compensation medium 316, has more than one eigenfrequency, for example a first eigenfrequency and a second eigenfrequency. Accordingly, the actuator 306 may actuate the sound emitting member 304 at more than one selected frequency that may be related to the first and second eigenfrequency. For example, the actuator 306 may actuate the sound emitting member 304 at a first frequency and a second frequency that may be identical to or close to the first and second eigenfrequency, respectively (e.g., within a predefined range from the first and second eigenfrequency, respectively). Actuating at more than one frequency may be done by simultaneous actuation with an actuation mode that comprises the first and second frequency or may be done with an actuation mode that alternately comprises the first frequency and the second frequency. Actuating at more than one frequency may also be done by utilizing more than one actuator (such as the actuator 306). For example, a first actuator may actuate at a first frequency and a second actuator may actuate at a second frequency. In such a configuration, arrangement of springs and masses about the center line of at least one of the first and the second actuator would be asymmetric, as noted above. Actuating by first and second actuator at first and second frequency, respectively, may occur simultaneously or alternately.

In operation, activation energy (e.g., electrical) is applied to the actuator 306, which drives movement, such as oscillation, which is transmitted to the sound emitting member 304 via the first coupling plate 320. Forces from the actuator 306 may cause a high frequency oscillation of the sound emitting member 304 due to flexing and movement at the second spring 314. In such an example scenario, only the first mass 312 is oscillating, which may be done at a different frequency than the combined mass of the first mass 308 and the second mass 312. For example, oscillation due to flexing at the first spring 310 may be for the combination of first mass 308 and second mass 312, which may be at a lower frequency. Accordingly, embodiments of the present disclosure enable the acoustic device 300 to operate at both high and low frequencies.

In operation, the springs 310, 314 may be subject to preload due to and in response to the loading of the actuator 306. Accordingly, various dimensions may be adjusted to account for such preloading. Both, the strength of material as well as the stiffness of the material increase with increasing thickness of the material. That is, a material with larger thickness will provide for a higher eigen frequency and will also withstand higher preloading. For example, to accommodate for higher preloads, the thickness of the of the springs 310, 314—and therefore the stiffness of the springs 310, 314—may be increased, however, this adjustment may also lead to an increased operating frequency. In at least one embodiment, springs 310, 314 are tuned to a particular frequency or frequency range while remaining strong enough to not break or plastically deform under load. In other words, a strength of the springs 310, 314 is selected to exceed a threshold where breakage may occur without being so stiff that frequency is increased beyond a desired level.

As noted herein, various embodiments of the present disclosure may include dimensions that are particularly selected based on a desired resonance frequency. By way of example only, systems and methods may be tuned to operate between approximately 2 and 20 kHz. Additionally, in one or more embodiments, systems and methods may be tuned to operate between approximately 3 to 14 kHz. As will be appreciated, different dimensions may be tuned to enable such an operational range, such as adjusting one or more thicknesses of the springs 310, 314 to adjust the one or more spring coefficients of the springs 310, 314. Moreover, changing surface areas for the masses 308, 312 may also tune the operation range. Furthermore, more than two mass portions or masses 308, 312 and/or more than two spring portions or springs 310, 314 may be included in acoustic device 300 to provide for more transmitted frequencies. Additionally, materials selected may also change the mass of various components, where more dense materials may be utilized to increase masses. Furthermore, materials may be selected with operating conditions in mind, where strong materials may be preferable or corrosion-resistant materials may be utilized. In one or more embodiments, portions may be formed from titanium or other materials that will be resistant to high-fatigue scenarios. However, it should be appreciated that other materials may also be utilized, such as steels and composite materials. Furthermore, in various embodiments, one or more high density materials may be used. Such tuning may change the operating frequency of the acoustic device 300, for example, by increasing or decreasing the mass. Additionally, other considerations may also drive material selection, such as thermal expansion and the like.

Various embodiments of the present disclosure may particularly select one or more dimensions for one or more of the masses 308, 312; springs 310, 314, and/or the like based, at least in part, on desired operating conditions. For example, an actuator height 334 or a height of the one or more coupling plates 320, 322 may be selected based on a depth of the recess 332, a desired compression force, one or more properties of the sound emitting member (e.g., a thickness), or the like. By way of non-limiting example, the actuator height 334 may be between approximately 20 mm and 50 mm. In another example, the actuator height 334 may be in the range of approximately 10 mm-60 mm, e.g., in the range of approximately 20 mm-50 mm, such as in the range of 30 mm-40 mm, or any other reasonable size. Furthermore, systems and methods may also be used to define properties of the actuator 306 based on cross-section, volume, preload, and/or like, as well as different combinations.

Additionally, systems and methods may also particularly select properties of the masses 308, 312, such as mass, a first mass length 336 (e.g., diameter), a first mass thickness 338, a second mass length 340, and/or a second mass thickness 342. Additionally, while not illustrated in the cross-sectional view of FIG. 3A, one or more features may also be based on a desired surface area of the masses 308, 312. As will be appreciated, the mass of the different masses 308, 312 may be used to select the other dimensions. For example, selecting a material of the masses 308, 312 will provide a density, which can then be used to determine a total volume, which can be used to select lengths 336, 340 and/or thicknesses 338, 342. By way of non-limiting example, the mass of one or both of the masses 308, 312 may be between 100 g and 1500 g. In another example, the mass may be approximately between 300 g and 1400 g, e.g., between 500 g and 1300 g, such as between 700 g and 1200 g, or even between 800 g and 1100 g, or any other reasonable mass. Additionally, masses may be selected individually or based on the combination of both masses 308, 312.

Moreover, various systems and methods may further particularly selected features of the springs 310, 314 based, at least in part, on desired operating conditions. In this example, one or more of a first spring length 344, a first spring thickness 346, a second spring length 348, and a second spring thickness 350 may be selected and/or adjusted based on desired operating conditions, selected components, and/or combinations thereof. The spring thicknesses 346, 350 may be increased to make them stiffer, or the material of section may also be selected to adjust stiffness. By way of non-limiting example, the spring thicknesses 346, 350 may be smaller than the first mass thickness 338 and/or second mass thickness 342. In another example, the thicknesses 346, 350 may be approximately in the range of 1 mm-5 mm, such as in the range of 2 mm-4 mm, or any other reasonable size.

Systems and methods may also particularly select one or more of a volume of the void 330 (e.g., a size of the recess 332) and/or a shape of the voice 330. For example, a shape of the recess may be adjusted to receive a specific volume, which may or may not include the passage 328. In at least one embodiment, adjusting the volume of the void 330 may change the amount of pressure compensation medium 316 filling the void 330 and/or the passage 328, which may then be used to tune and compensate movement of the actuator 306 and/or the sound emitting member 304. By way of non-limiting example, the volume of the void 330 and/or the passage 328 may be between approximately 0.01 liter and 2 liter. In another example, the volume may be approximately in the range between 0.1 liter and 2 liter, e.g., between 0.25 liter and 1.75 liter, such as between 0.5 liter and 1.5 liter or even between 0.75 liter and 1.25 liter, or any other reasonable amount.

Various embodiments may also select a thickness 352 of the fixing member 318 and/or a fixing area of the fixing member 318 as well as a thickness 369 and/or coupling area 368 of one or more of the coupling plates 320, 322. As noted herein, the fixing member 318 may be used to secure the sound emitting member 304 to the carrier 302, to apply preload (e.g., pre-compression) to the actuator 306, and/or to seal void 330 from wellbore environment 326 (e.g., by providing support for seals 370), among other options. By way of non-limiting example, the thickness 352 may be between approximately 2 mm and 15 mm, e.g., between approximately 5 mm and 12 mm, such as between approximately 7 mm and 10 mm, or any other reasonable size.

Figure 3B:
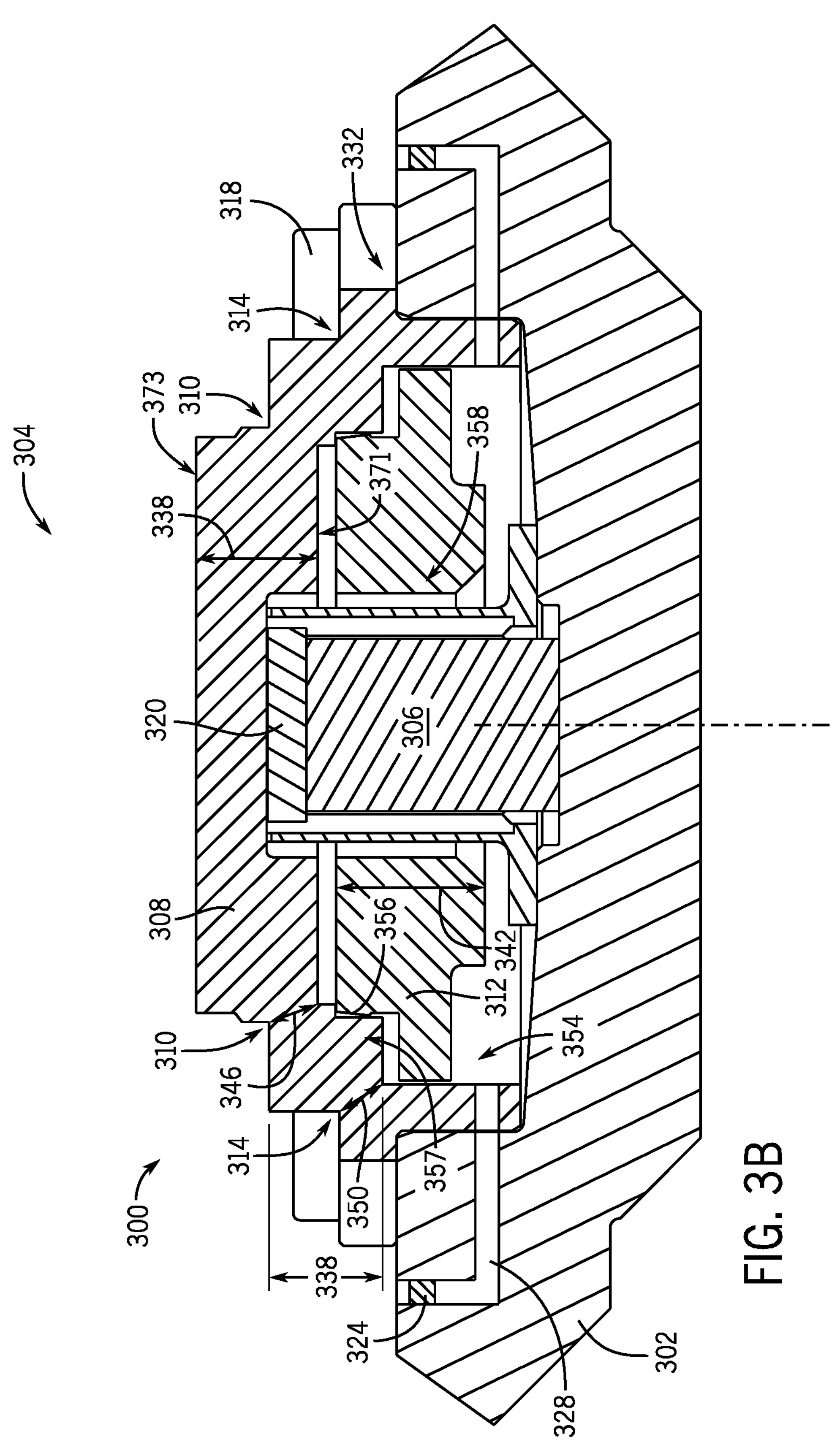
FIG. 3B is a schematic cross-sectional view of an embodiment of an acoustic device, in accordance with embodiments of the present disclosure.

FIG. 3B illustrates a cross-sectional schematic view of an embodiment of the acoustic device 300 in which the first mass 308 and the second mass 312 are in a stacked configuration. In at least one embodiment, the illustrated acoustic device 300 may include two or more masses that are positioned to vibrate at difference frequencies to produce acoustic waves within a downhole environment to obtain one or more properties of a downhole formation. In operation, resonance may be a function of stiffness and mass, where an increased mass leads to a decreased frequency. Systems and methods may be directed toward two or more masses that are operate at different frequencies, thereby enabling emission at high and low frequencies using a common source.

It should be appreciated that various components may be described with reference to individual or separate parts, but in various embodiments parts may be segmented or joined together. Furthermore, one or more features may be removed for clarity and conciseness with the present disclosure. As an example, one or more electrical components associated with the source or acoustic device 300 are removed, where the electrical components may drive a piezo material and/or send and receive signals associated with operation of the acoustic device 300. By way of example only, one or more electrical systems may include a coil or magnetostrictive element that receives one or more inputs (e.g., an electrical input) to cause vibration or deformation, which may be transmitted to another element or directly into the wellbore fluid. Adjustments to this frequency may drive movement of the one or more masses, thereby producing acoustic waves.

The illustrated acoustic device 300 includes the body or the carrier 302, which may also be referred to as a carrier or support. The body includes the recess 332 (e.g., recessed portion) that receives at least a portion of the sound emitting member 304. As noted above, the sound emitting member 304, or components thereof, may also be referred to as an element that receives energy to generate an acoustic signal. In one or more embodiments, the sound emitting member may include the first mass 308 and the second mass 312. The first mass 308, in this example, may be referred to as an outer or upper mass, while the second mass 312 may be referred to as an inner or lower mass. As noted above, the terms "upper", "lower", "outer" and "inner" are described with reference to the illustrated embodiments and are not intended to be limiting. By way of example, in one or more embodiments, the lower mass could also be positioned on the outer side of the upper mass.

In the illustrated configuration, the first mass 308 includes an opening 354 to receive the second mass 312 which is coupled to the carrier 302 via second spring 314. Furthermore, in at least one embodiment, the second mass 312 may be secured to the first mass 308 via a first spring 310 or a spring portion. As noted, the springs 310, 314 and the masses 308 and 312 may differ only with respect to their dimensions. In this sense, the spring portions or the springs 310, 314 of the sound emitting member 304 may be defined where the thicknesses 346, 350 of the sound emitting member 304 are relatively small (e.g., smaller than a threshold) or where elastic modulus (Young's modulus) of the sound emitting member 304 is relatively high while mass portions or masses 308 and 312 are defined where the thicknesses 338, 342 of the sound emitting member 304 are relatively large (e.g., larger than a threshold) or where elastic modulus (Young's modulus) of the sound emitting member 304 is relatively low. As such, the terms "spring" and "spring portion" are synonyms and are used and meant in the same manner irrespective of springs or spring portions being separate parts (e.g. separated, such as not integral with a mass or mass portion or loosely connected, such as rotatably connected, to a mass or mass portion) or being portions of parts or assemblies (i.e., integral with or fixedly connected to a mass or mass portion). Similarly, the terms "mass" and "mass portion" are synonyms and are used and meant in the same manner irrespective of masses or mass portions being separate parts (e.g. separated, such as not integral with a spring or spring portion or loosely connected, such as rotatably connected, to a spring or spring portion) or being portions of parts or assemblies (i.e., integral with or fixedly connected to a spring or spring portion). In the context of this disclosure, the thickness of the sound emitting member 304 at a specific location of an inner surface 371 of the sound emitting member 304 (e.g., the surface that is in contact with pressure compensation medium 316) is defined as the shortest distance from the specific location at the inner surface 371 of the sound emitting member 304 to the outer surface 373 of the sound emitting member 304 (e.g., the outer surface 373 that is in contact with the wellbore environment 326). Similarly, the thickness of the sound emitting member 304 at a specific location at the outer surface 373 of the sound emitting member 304 is defined as the shortest distance from the specific location at the outer surface 373 of the sound emitting member 304 to the inner surface 371 of the sound emitting member 304. That is, thicknesses of the sound emitting member 304 are not necessarily measured in a direction that is perpendicular to the inner surface 371 or the outer surface 373. As such, sound emitting member 304 may have an inner surface 371 and outer surface 373, wherein the thickness or the shortest distance between the inner surface 371 and the outer surface 373 at a first location on one of the inner and out surface 371, 373 is different from the thickness or the shortest distance between the inner surface 371 and the outer surface 373 at a second location on one of the inner and out surface 371, 373. Alternatively or in addition, spring portions or springs 310, 314 may be defined relative to mass portions or masses 308, 312. For example, spring portions or springs 310, 314 may be defined at locations where the thickness of the material and/or the elastic modulus (Young's modulus) is lower than at locations where the mass portions or the masses 308, 312 are defined, for example, lower by a factor q, where q may be 0.5 or smaller, for example 0.2 or smaller, such as 0.1 or below. As shown, a portion of the second mass 312 extends into the recess 332. However, in at least one embodiment, the sound emitting member 304 and/or portions thereof may not be located in the recess 332. The opening 354 may be sealed by one or more seals (such as seals 370, 372) from the wellbore environment so that the second mass 312 is fully surrounded by pressure compensation medium 316 and isolated from wellbore fluid in the wellbore environment 326 to prevent second mass 312 from damages that may be caused by contact with wellbore fluid. Further illustrated are one or more first springs 310 (e.g., spring portions, reactive portions, biasing portions, etc.), which may be used to transmit, attenuate, or absorb forces applied to one or both of the masses 308, 312, such as from the actuator 306. In the illustrated embodiment, the actuator 306 is a piezo element, but a piezo material is provided as an example, other embodiments may include other actuators, such as, a voice coil or a magneto restrictive material, among other examples. In this example, the actuator 306 is a multilayer piezo element that includes piezo slices with electrodes positioned between the slices. Such an arrangement may enable lower voltage operation while still providing sufficient expansion for operation within the system. In this example, the first mass 308 extends into the recess 332 and may be secured to the carrier 302 using one or more fixing members 318, as described herein, and/or by way of friction fit or other engagement to the carrier 302.

Various embodiments of the present disclosure include the one or more spring portions or springs 310 (e.g., the first spring) that provide flexibility and movement of the first mass 308 responsive to an input force. It should be appreciated that the spring portions may have a substantially square or rectangular cross-section, as shown in FIG. 3B, or may be curved, arcuate, sloped, combinations thereof, or any other reasonable shape. Moreover, it should be appreciated that the thickness 338 at the various spring portions 310 may be particularly selected to be responsive to one or more frequency ranges based, at least in part, on properties of one or more components of the acoustic device 300, such as a material used to form the first mass 308, dimensions of the first mass 308, a material used to form the second mass 312, dimensions of the second mass 312, and the like. In other words, the first mass 308, through adjustment of one or more dimensions, may be tuned for operation within one or more frequency ranges. Additionally, as shown in this example, the thickness 338 may vary at different portions of the spring portion 310.

The illustrated embodiment further shows the second mass 312 arranged within the opening 354 of the first mass 308 and may be secured to the first mass 308 and/or spring portions or springs 310, 314 via one or more retention members 356. In at least one embodiment, the retention members 356 are outwardly sloped portions of the second mass 312 sized to engage at least a portion of the first mass 308. The one or more retention members 356 may be received by a receiving portion 357, such as an opening (e.g., a groove or otherwise recessed portion) that may be located or otherwise connected between the first spring portion or spring 310 and the second spring portion or spring 314. Retention member 356 may be held in position by the force of one or more of the first spring portion or spring 310 and the second spring portion or spring 314 as well as by the preload that is applied by engaging the first mass portion or mass 308 with actuator 306 and/or coupling plate 320. While the utilization of first spring portion or spring 310 or second spring portion or spring 314 is advantageous as no additional parts are needed to hold second mass portion or mass 312 in place, other methods of connecting second mass portion or mass 312 to first mass portion or mass 308 and/or carrier 302, such as by clamping mechanisms, screws, locking elements (e.g., snap rings) may be utilized as well.

In at least one embodiment, the second mass 312 includes a bore 358 to permit the actuator 306 to extend up to the first mass 308. The first coupling plate 320 is also illustrated between the first mass 308 and the actuator 306. In operation, the coupling plate 320 may be utilized to transmit energy from the actuator 306 to the sound emitting member 304, for example by applying a force against the first mass 308. It should be appreciated that the location of the coupling plate 320 is provided as an example, and the coupling plate 320 may also be arranged at an opposite end of the actuator 306. That is, embodiments may omit the use of two coupling plates 320, 322 and use one or the other of the coupling plates 320, 322. Additionally, no coupling plates could be used.

In one or more embodiments, the actuator 306 is maintained under compression during operation. In at least one embodiment, fixing member 318 are utilized to secure one or more components to the carrier 302, such as the first mass 308. For example, a compressive force may be applied to the first mass 308, via securing the fixing member 318 to the carrier 302, which transmits the compression against the coupling plate 320 and then to the actuator 306. Because the actuator 306 may be a piezo element, which may be considered highly dynamic, maintaining the compression may prevent damage to the actuator 306. It should be appreciated that various other components, may also be utilized to compress the actuator 306 and that the fixing member 318 are shown by way of example only.

As described herein with respect to FIG. 3A, it should be appreciated that various dimensions, lengths, thickness, materials of construction, and the like may also be varied with respect to the stacked configuration of FIG. 3B.

Figure 4:
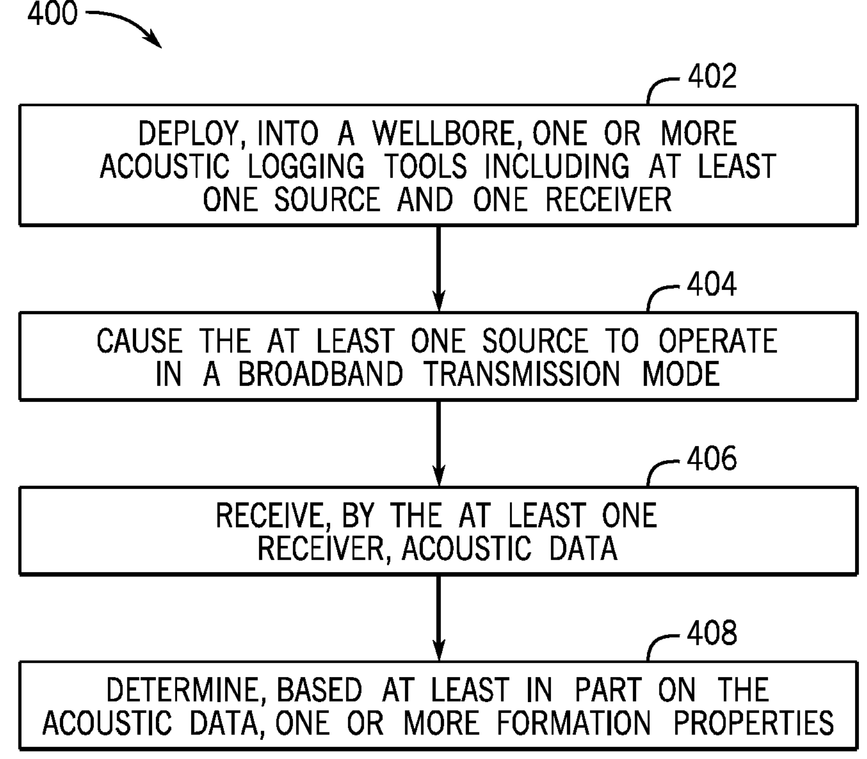
FIG. 4 is a flow chart of an embodiment of a method for determining one or more formation properties based on acoustic data, in accordance with embodiments of the present disclosure.

FIG. 4 is a flow chart of an embodiment of a method 400 for determining one or more formation properties. It should be appreciated that this method, or any method described herein, may include more or fewer steps. Additionally, the steps may be performed in a different order, or in parallel, unless otherwise specifically stated. In this example, in step 402, one or more acoustic logging tools are deployed into a wellbore. The tools may include one or more sources and one or more receivers. In step 404, in at least one embodiment, the one or more sources may operate in a broadband transmission mode. For example, a broadband transmission mode may enable a single source to operate at two or more different frequencies or frequency ranges with an emission energy that exceeds a threshold. In step 406, the at least one receiver may receive acoustic data, responsive to the emission of acoustic signals from the one or more sources. In step 408, the acoustic data may be utilized, at least in part, to determine one or more formation properties.

Various Embodiments May Also be Described in View of the Following Clauses:

1. An acoustic transmitter system, comprising:

a carrier;

a sound emitting member secured to the carrier, the sound emitting member comprising:

a first mass coupled to the carrier by a first spring; and a second mass coupled to the first mass by a second spring; and an actuator configured to transmit energy to the sound emitting member.

2. The acoustic transmitter system of clause 1, further comprising:

a pressure compensation medium at least partially disposed within the carrier, wherein at least one of the first mass and the second mass is in contact with the pressure compensation medium.

3. The acoustic transmitter system of clause 2, where at least one of the first mass and the second mass is in contact with a wellbore fluid.

4. The acoustic transmitter system of clause 1, wherein the energy transmitted by the actuator comprises at least one periodic movement having an amplitude, and wherein at least one of the first spring and the second spring is configured to provide a preload to the actuator that compresses the actuator by a compression length that is greater than the amplitude.

5. The acoustic transmitter system of clause 4, wherein the at least one of the first spring and the second spring provides the preload to the actuator when the actuator is not actuating.

6. The acoustic transmitter system of clause 1, wherein the energy transmitted by the actuator comprises at least one periodic movement having a first actuating frequency and a second actuating frequency.

7. The acoustic transmitter system of clause 6, wherein the sound emitting member is configured to emit an acoustic wave into an environment at least partially surrounding the acoustic transmitter system, and wherein the acoustic wave comprises a first frequency and a second frequency, wherein at least one of the first and the second frequency is within a predefined range from at least one of the first actuating frequency and the second actuating frequency.

8. The acoustic transmitter system of clause 1, wherein the first mass and the second mass are in a stacked configuration.

9. The acoustic transmitter system of clause 1, wherein the first mass, the second mass, and the second spring are made of one integral part.

10. The acoustic transmitter system of clause 9, wherein the second spring has a thickness that is less than a first thickness of the first mass and a second thickness of the second mass.

11. A method for making acoustic measurements in a wellbore environment, the method comprising:

disposing an acoustic receiver into a wellbore;

disposing an acoustic transmitter system into the wellbore, the acoustic transmitter system comprising:

a carrier;

a sound emitting member secured to the carrier, the sound emitting member comprising:

a first mass coupled to the carrier by a first spring; and a second mass coupled to the first mass by a second spring; and an actuator configured to transmit energy to the sound emitting member;

emitting an acoustic wave from the sound emitting member into the wellbore in response to the energy transmitted from the actuator; and receiving a received acoustic wave, at the receiver, in response to the emitted acoustic wave.

12. The method of clause 11, wherein the acoustic transmitter system further comprises:

a pressure compensation medium at least partially disposed within the carrier, wherein at least one of the first mass and the second mass is in contact with the pressure compensation medium.

13. The method of clause 12, further comprising:

disposing a wellbore fluid within the wellbore, wherein the at least one of the first mass and the second mass is in contact with the wellbore fluid.

14. The method of clause 13, wherein the energy transmitted by the actuator comprises at least one periodic movement having an amplitude, and wherein the method further comprises:

providing, by at least one of the first spring and the second spring, a preload to the actuator that compresses the actuator by a compression length that is greater than the amplitude.

15. The method of clause 14, wherein the at least one of the first spring and the second spring provides the preload to the actuator when the actuator is not actuating.

16. The method of clause 11, wherein the energy transmitted by the actuator comprises at least one periodic movement having a first actuating frequency and a second actuating frequency.

17. The method of clause 16, wherein the acoustic wave comprises a first frequency and a second frequency, wherein at least one of the first frequency and the second frequency is within a predefined range from at least one of the first actuating frequency and the second actuating frequency.

18. The method of clause 11, wherein the first mass and the second mass are in a stacked configuration.

19. The method of clause 11, wherein the first mass, the second mass, and the second spring are made of one integral part.

20. The method of clause 19, wherein the second spring has a thickness that is less than a first thickness of the first mass and a second thickness of the second mass.

21. A system, comprising:

a carrier;

a sound emitting member secured to the carrier, the sound emitting member comprising:

a first mass coupled to the carrier;

a second mass coupled to the first mass; and spring portions which couple the first mass, the second mass, and the carrier; and an actuator configured to transmit energy to at least the first mass.

22. The system of clause 21, wherein the actuator is at least one of a piezo electric material, a voice coil, a magneto restrictive material, a linear drive, or a rotary drive.

23. The system of clause 22, wherein the piezo electrical material is compressed within a recess formed in the carrier.

24. The system of clause 21, wherein the sound emitting member is configured to emit acoustic waves responsive to the energy from the actuator, the sound emitting member emitting first acoustic waves responsive to movement of a combination of the first mass and the second mass, and the sound emitting member emitting second acoustic waves responsive to movement of only the first mass.

25. The system of clause 21, wherein the first mass and the second mass are in a stacked configuration.

26. The system of clause 21, wherein at least one of a first mass weight, a first mass surface area, a first mass material of construction, or a first spring portion associated with the first mass is different from an associated second mass weight, an associated second mass surface weight, an associated second mass material, or an associated second spring portion associated with the second mass.

27. The system of clause 21, further comprising:

a first oscillating system with a first natural frequency including a first spring portion of the spring portions and the first mass; and a second oscillating system with a second natural frequency including the first mass, the second mass, and a second spring portion of the spring portions.

28. The system of clause 21, further comprising:

a drill string having an opening configured to receive the carrier.

29. The system of clause 21, wherein the carrier forms at least a portion of a drill string.

30. The system of clause 21, further comprising:

a recess formed within the carrier; and a compensation medium filling at least a portion of the recess.

31. The system of clause 30, further comprising:

a pressure compensation system, comprising:

a flow path between the recess and an outlet; and a pressure regulation device arranged along the flow path.

32. The system of clause 31, wherein the pressure regulation device is at least one of a piston or a flexible membrane.

33. A system, comprising:

a first mass;

a second mass coupled to the first mass; and an actuator positioned to transmit a force to at least the first mass;

wherein the second mass is coupled to the first mass, at least in part, by a second spring portion, and further wherein responsive to the force, the first mass resonates at a first frequency or a second frequency, the first frequency corresponding to a combined vibration of both the first mass and the second mass and the second frequency corresponding to a single vibration of the first mass.

34. The system of clause 33, further comprising:

a carrier, wherein the first mass is coupled to the carrier via a first spring portion.

35. The system of clause 34, wherein at least a portion of the second mass is positioned within a recess formed in the carrier.

36. The system of clause 33, wherein the first mass and the second mass are arranged in a stacked configuration in which the first mass and the second mass are axially aligned.

37. The system of clause 33, wherein a weight of the first mass is different from a weight of the second mass or the first spring portion is different from the second spring portion.

38. A method, comprising:

securing a first mass to a carrier using a first spring portion;

securing a second mass to the first mass using a second spring portion;

applying a force, to the first mass, via one or more actuators; and causing at least one of the first mass or a combination of the first mass and the second mass to emit an acoustic wave based, at least in part, on a selected operational frequency of the one or more actuators.

39. The method of clause 38, further comprising:

securing the carrier to a downhole drill string.

40. The method of clause 38, further comprising:

receiving reflected energy from the acoustic force at a receiver.

The foregoing disclosure and description of the disclosed embodiments is illustrative and explanatory of various embodiments of the present disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. An acoustic transmitter system, comprising:

a carrier;

a sound emitting member secured to the carrier, the sound emitting member configured to operate in a wellbore fluid, the sound emitting member comprising:

a first mass coupled to the carrier by a first spring; and a second mass coupled to the first mass by a second spring;

wherein an inner surface of the sound emitting member is sealed from the wellbore fluid by one or more seals; and an actuator configured to transmit energy to the sound emitting member.

2. The acoustic transmitter system of claim 1, further comprising:

a pressure compensation medium at least partially disposed within the carrier, wherein at least one of the first mass and the second mass is in contact with the pressure compensation medium.

3. The acoustic transmitter system of claim 2, where at least one of the first mass and the second mass is in contact with the wellbore fluid.

4. The acoustic transmitter system of claim 1, wherein the energy transmitted by the actuator comprises at least one periodic movement having an amplitude, and wherein at least one of the first spring and the second spring is configured to provide a preload to the actuator that compresses the actuator by a compression length that is greater than the amplitude.

5. The acoustic transmitter system of claim 4, wherein the at least one of the first spring and the second spring provides the preload to the actuator when the actuator is not actuating.

6. The acoustic transmitter system of claim 1, wherein the energy transmitted by the actuator comprises at least one periodic movement having a first actuating frequency and a second actuating frequency.

7. The acoustic transmitter system of claim 6, wherein the sound emitting member is configured to emit an acoustic wave into an environment at least partially surrounding the acoustic transmitter system, and wherein the acoustic wave comprises a first frequency and a second frequency, wherein at least one of the first and the second frequency is within a predefined range from at least one of the first actuating frequency and the second actuating frequency.

8. The acoustic transmitter system of claim 1, wherein the first mass and the second mass are in a stacked configuration.

9. The acoustic transmitter system of claim 1, wherein the first mass, the second mass, and the second spring are made of one integral part.

10. The acoustic transmitter system of claim 9, wherein the second spring has a thickness that is less than a first thickness of the first mass and a second thickness of the second mass.

11. A method for making acoustic measurements in a wellbore environment, the method comprising:

disposing an acoustic receiver into a wellbore;

disposing an acoustic transmitter system into the wellbore, the acoustic transmitter system comprising:

a carrier;

a sound emitting member secured to the carrier, the sound emitting member comprising:

a first mass coupled to the carrier by a first spring; and a second mass coupled to the first mass by a second spring, wherein an inner surface of the sound emitting member is sealed from a wellbore fluid by one or more seals; and an actuator configured to transmit energy to the sound emitting member;

emitting an acoustic wave from the sound emitting member into the wellbore in response to the energy transmitted from the actuator; and receiving a received acoustic wave, at the receiver, in response to the emitted acoustic wave.

12. The method of claim 11, wherein the acoustic transmitter system further comprises:

a pressure compensation medium at least partially disposed within the carrier, wherein at least one of the first mass and the second mass is in contact with the pressure compensation medium.

13. The method of claim 12, further comprising:

disposing the wellbore fluid within the wellbore, wherein the at least one of the first mass and the second mass is in contact with the wellbore fluid.

14. The method of claim 13, wherein the energy transmitted by the actuator comprises at least one periodic movement having an amplitude, and wherein the method further comprises:

providing, by at least one of the first spring and the second spring, a preload to the actuator that compresses the actuator by a compression length that is greater than the amplitude.

15. The method of claim 14, wherein the at least one of the first spring and the second spring provides the preload to the actuator when the actuator is not actuating.

16. The method of claim 11, wherein the energy transmitted by the actuator comprises at least one periodic movement having a first actuating frequency and a second actuating frequency.

17. The method of claim 16, wherein the received acoustic wave comprises a first frequency and a second frequency, wherein at least one of the first frequency and the second frequency is within a predefined range from at least one of the first actuating frequency and the second actuating frequency.

18. The method of claim 11, wherein the first mass and the second mass are in a stacked configuration.

19. The method of claim 11, wherein the first mass, the second mass, and the second spring are made of one integral part.

20. The method of claim 19, wherein the second spring has a thickness that is less than a first thickness of the first mass and a second thickness of the second mass.

* * * * *